US012474875B2

(12) United States Patent
Mori et al.

(10) Patent No.: US 12,474,875 B2
(45) Date of Patent: Nov. 18, 2025

(54) RECORDING APPARATUS, CONSUMABLE FOR RECORDING APPARATUS, AND INFORMATION PROCESSING METHOD

(71) Applicant: BROTHER KOGYO KABUSHIKI KAISHA, Nagoya (JP)

(72) Inventors: Tetsunori Mori, Kariya (JP); Taichiro Kimoto, Nagoya (JP); Zenichiro Sasaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 353 days.

(21) Appl. No.: 17/933,532

(22) Filed: Sep. 20, 2022

(65) Prior Publication Data

US 2023/0114658 A1 Apr. 13, 2023

(30) Foreign Application Priority Data

Sep. 28, 2021 (JP) ................................ 2021-158536

(51) Int. Cl.
*G06F 3/12* (2006.01)
*B41J 2/175* (2006.01)

(52) U.S. Cl.
CPC ............ *G06F 3/12* (2013.01); *B41J 2/17546* (2013.01)

(58) Field of Classification Search
CPC ................................ G06F 3/12; B41J 2/17546
USPC ............................................................ 347/86
See application file for complete search history.

(56) References Cited

U.S. PATENT DOCUMENTS

| | | | |
|---|---|---|---|
| 6,658,219 | B1 | 12/2003 | Ito et al. |
| 7,796,286 | B2 | 9/2010 | Omotani |
| 10,488,804 | B2 | 11/2019 | Sato |
| 10,843,478 | B2 | 11/2020 | Komine |

(Continued)

FOREIGN PATENT DOCUMENTS

| | | | |
|---|---|---|---|
| CN | 106364168 | A | 2/2017 |
| JP | H09114334 | A | 5/1997 |

(Continued)

OTHER PUBLICATIONS

Extended European Search Report dated Feb. 15, 2023 from related EP 22195553.7.

*Primary Examiner* — Jason S Uhlenhake
*Assistant Examiner* — Alexander D Shenderov
(74) *Attorney, Agent, or Firm* — Scully, Scott, Murphy & Presser, P.C.

(57) ABSTRACT

A recording apparatus includes a main body of the recording apparatus, and a consumable which is detachably attached to the main body of the recording apparatus. The consumable has a consumable memory which stores use amount information of a consumable material included in the consumable and recycling history information of the consumable. The main body of the recording apparatus has a communication unit which communicates with the consumable memory, and a processor. The processor acquires the recycling history information from the consumable memory of the consumable mounted on the main body of the recording apparatus by communication via the communication unit, and determines whether or not to perform initialization processing of initializing a value of the use amount information stored in the consumable memory, according to the acquired recycling history information.

13 Claims, 13 Drawing Sheets

(56) References Cited

U.S. PATENT DOCUMENTS

| | | | | |
|---|---|---|---|---|
| 2004/0032442 | A1* | 2/2004 | Phillips | B41J 2/17506 347/19 |
| 2005/0078969 | A1 | 4/2005 | Kikuchi | |
| 2005/0244170 | A1 | 11/2005 | Ono et al. | |
| 2006/0192993 | A1 | 8/2006 | Omotani | |
| 2008/0273883 | A1* | 11/2008 | Kim | G03G 15/0855 399/25 |
| 2009/0112738 | A1* | 4/2009 | Nagata | G06Q 30/0283 705/28 |

FOREIGN PATENT DOCUMENTS

| | | | |
|---|---|---|---|
| JP | 2000-19803 | A | 1/2000 |
| JP | 2001125377 | A | 5/2001 |
| JP | 2001341322 | A | 12/2001 |
| JP | 2005140800 | A | 6/2005 |
| JP | 2005316228 | A | 11/2005 |
| JP | 2006243708 | A | 9/2006 |

* cited by examiner

COMPARATIVE EXAMPLE

EMBODIMENT

FIG. 5

| CAPACITY | USE AMOUNT INITIAL VALUE [ml] |
|---|---|
| STANDARD | 15 |
| LARGE | 50 |
| EXTRA LARGE | 100 |

RECORDING APPARATUS, CONSUMABLE FOR RECORDING APPARATUS, AND INFORMATION PROCESSING METHOD

REFERENCE TO RELATED APPLICATIONS

This application claims priority from Japanese Patent Application No. 2021-158536 filed on Sep. 28, 2021. The entire content of the priority application is incorporated herein by reference.

BACKGROUND ART

A consumable of a recording apparatus enabling recycling or reusing of a consumable once used, from standpoints of environmental protection and ecology, is known. The consumable is, for example, a cartridge.

When intending to reuse the consumable of the recording apparatus, the reusing is usually performed at a dedicated recycling factory. At the recycling factory, after used consumables in which consumable materials such as ink and toner are empty are collected, the consumables are made as recycled products (reused products) by re-dispensing consumable materials into the respective consumable so that users can use the products.

On the other hand, in recent years, a configuration is suggested in which, in order to properly and efficiently manage a consumable material in a consumable in a recording apparatus, a consumable memory is provided on the consumable-side, a communication unit is provided on a recording apparatus main body-side and various information is transmitted and received between the communication unit and the consumable memory by communication. In this case, the consumable memory stores use amount information representing, for example, a remaining amount and a used amount of the internal consumable material. As the consumable is mounted on the main body of the recording apparatus and the remaining amount of the consumable material is reduced, communication is performed from the communication unit in the main body of the recording apparatus to the consumable memory at an appropriate timing, so that the use amount information stored in the consumable memory is updated. As a result, in the consumable after use, the remaining amount represented by the use amount information in the consumable memory is almost zero.

When performing the above-described reusing for the consumable provided with such a consumable memory, the consumable is refilled with the consumable material by the re-dispensing described above. For this reason, it is necessary to perform initialization, such as returning the use amount information to a content corresponding to the filled state, i.e., for example, a 100% notation representing a full state.

However, since an amount of the consumable material required for re-dispensing may differ depending on a type and a size of the consumable, and the required communication specification and the like may differ depending on the specification of the consumable memory, a processing burden at the recycling factory may increase. In particular, in order to widely spread the reuse of consumables, it is necessary for as many waste disposal companies as possible to handle the recycling at the recycling factory. However, depending on the scale, capacity and the like of the disposal companies, there is a risk that the increase in the processing burden will be a hamper.

DESCRIPTION

An object of the present disclosure is to provide a recording apparatus, a consumable for a recording apparatus, and an information processing method capable of reducing a processing load on a consumable memory at a recycling factory.

An aspect of the present disclosure is a recording apparatus including: a main body of the recording apparatus; and a consumable configured to be detachably attached to the main body of the recording apparatus, in which the consumable has at least a consumable memory that stores use amount information of a consumable material included in the consumable and recycling history information of the consumable, in which the main body of the recording apparatus has a communication unit configured to communicate with the consumable memory, and a processor, and in which the processor is configured to perform: first acquisition processing of acquiring the recycling history information from the consumable memory of the consumable mounted on the main body of the recording apparatus by communication via the communication unit; and determination processing of determining whether or not to perform initialization processing of initializing a value of the use amount information stored in the consumable memory, according to the acquired recycling history information.

In the aspect, the use amount information of the consumable and the recycling history information of the consumable are stored in the consumable memory. The use amount information in the stored contents is processed by the initiative of the recording apparatus-side.

By performing the first acquisition processing, the processor of the recording apparatus communicates with the consumable memory of the consumable mounted on the main body of the recording apparatus via the communication unit, and acquires the recycling history information.

The processor performs the determination processing of determining whether or not to perform the initialization processing of initializing the value of the use amount information stored in the consumable memory, based on the acquired recycling history information. When it is determined to perform the initialization processing, the initialization processing of the value of the use amount information in the consumable memory is performed.

According to the aspect, since the recording apparatus identifies the recycling history of consumable and the value of the use amount information is accordingly initialized as appropriate, it is not necessary to initialize the use amount information at the recycling factory, and it is sufficient to perform the simple processing of just updating the recycling history information. According to the first to third aspects, it is possible to reduce the processing load at the recycling factory.

According to the aspect, it is possible to reduce the processing load on the consumable memory at the recycling factory.

FIG. 5 shows a use amount initial value table stored in the complex machine.

An embodiment of the present disclosure will be described with reference to the drawings.

<Complex Machine>

Figure 1A:
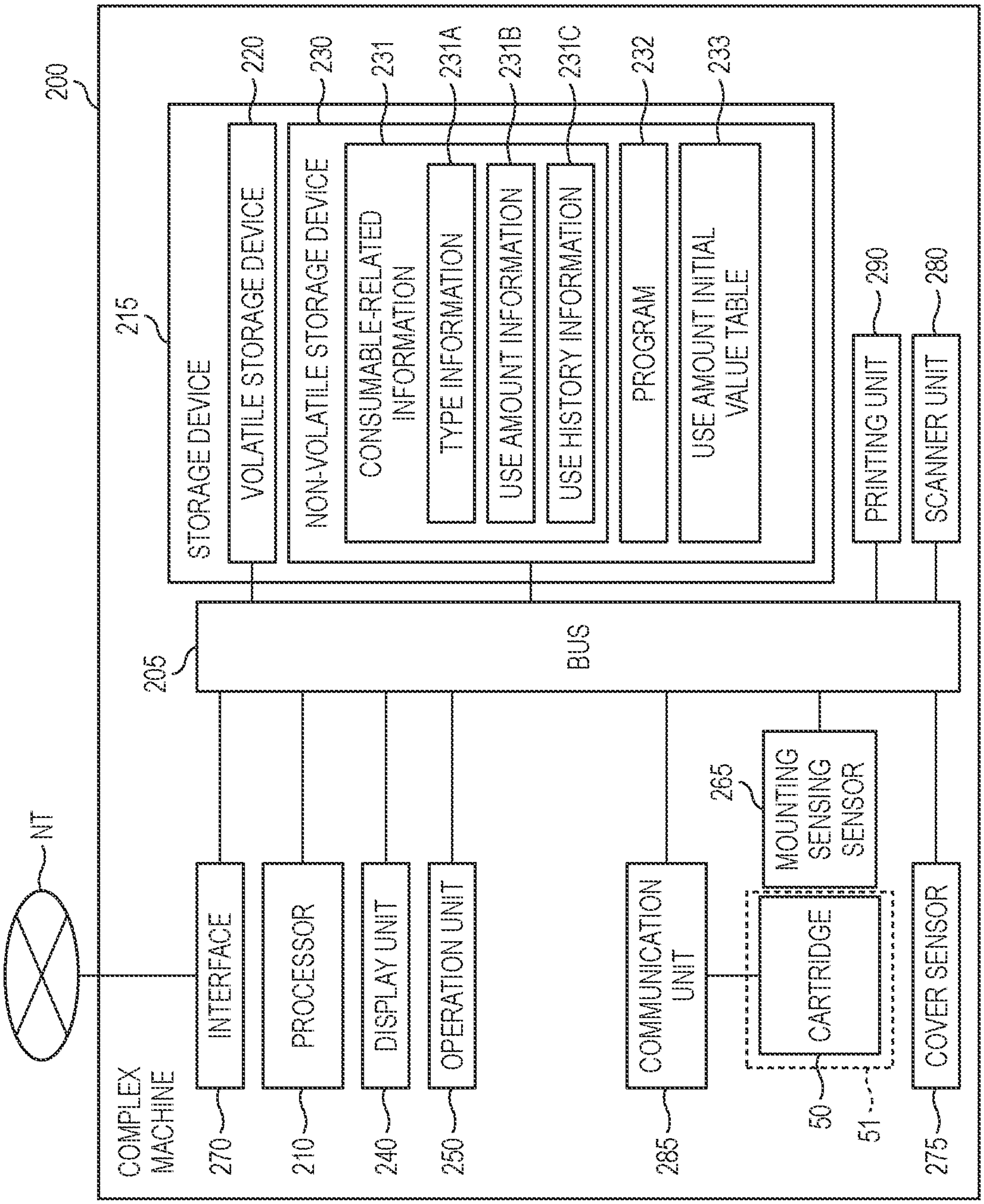
FIG. 1A is a functional block diagram showing an overall schematic configuration of a complex machine according to an embodiment of the present disclosure.
Figure 1B:
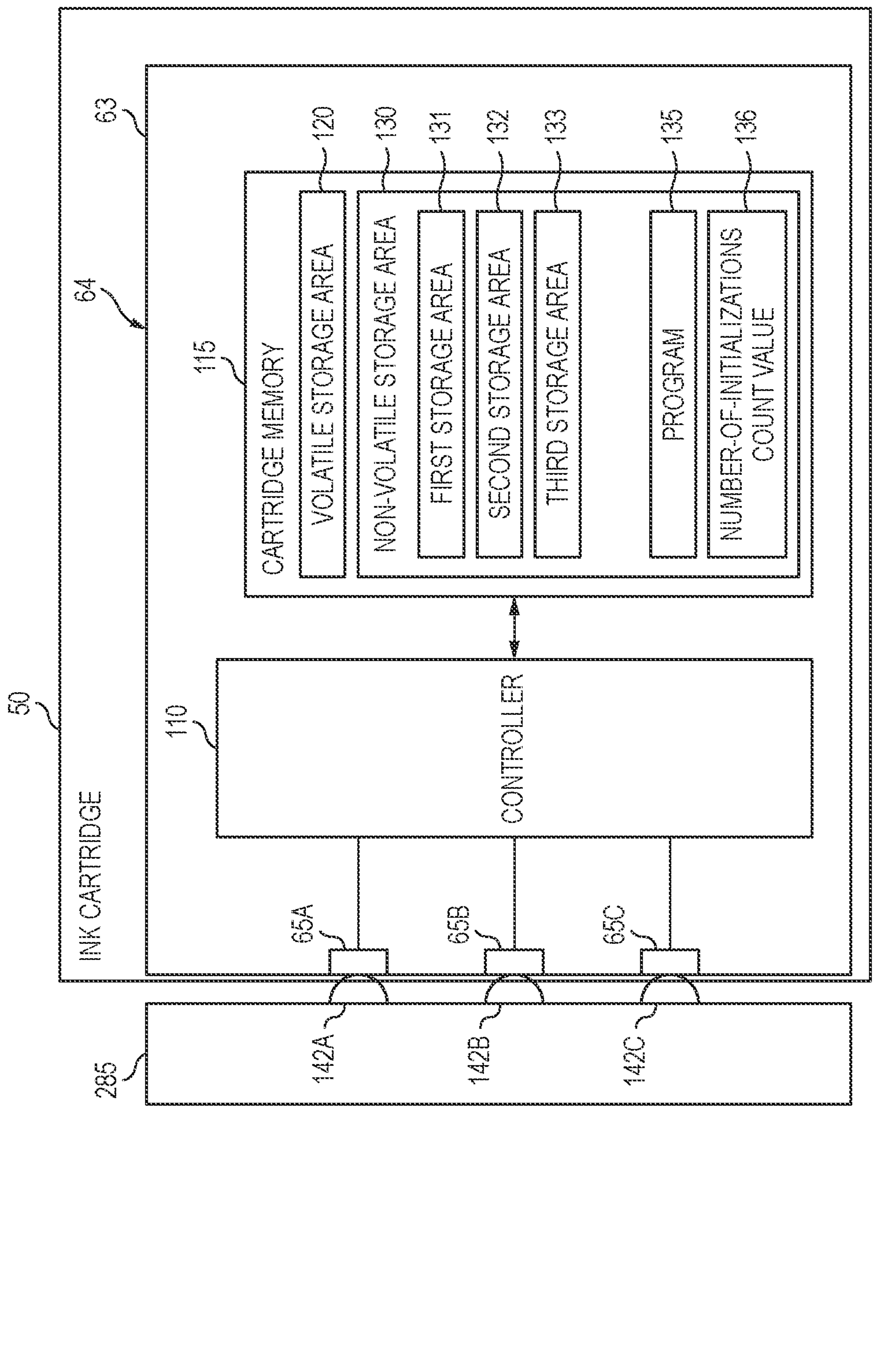
FIG. 1B is a functional block diagram showing a schematic configuration of an ink cartridge.

A schematic configuration of a complex machine 200 according to one embodiment of the present disclosure is shown in FIG. 1A, and a detailed configuration of an ink cartridge 50 provided to the complex machine 200 is shown in FIG. 1B. Note that, the complex machine 200 is an example of a main body of a recording apparatus. The ink cartridge 50 is an example of a consumable for the recording apparatus.

As shown in FIG. 1A, the complex machine 200 includes a scanner unit 280, a printing unit 290, a processor 210, a storage device 215, a display unit 240, an operation unit 250, a communication unit 285, a mounting detecting sensor 265, a communication interface 270, and a cover sensor 275. The scanner unit 280, the printing unit 290, the processor 210, the storage device 215, the display unit 240, the operation unit 250, the communication unit 285, the mounting detecting sensor 265, the cover sensor 275, and the communication interface 270 are connected to each other via a bus 205.

<Storage Device>

The storage device 215 includes a volatile storage device 220 and a non-volatile storage device 230. The storage device 215 is an example of the main body memory. The volatile storage device 220 is, for example, a DRAM. The non-volatile storage device 230 is, for example, a flash memory. The non-volatile storage device 230 has a consumable-related information storage area 231 for storing consumable-related information relating to the ink cartridge 50, a program storage area 232, and a storage area 233 of a use amount initial value table, which will be described later.

The consumable-related information storage area 231 has a type information storage area 231A, a use amount information storage area 231B, and a use history information storage area 231C. These functions will be described later.

A variety of programs are stored in the program storage area 232, and the various programs include an operation program for the complex machine, including a print processing program relating to execution of an information processing method of the present embodiment based on flowcharts in FIGS. 4A, 4B, 8A, 8B, 10A and 10B, which will be described later. The print processing program is stored in advance in the program storage area 232, as firmware, for example.

<Other Respective Units>

The display unit 240 is, for example, a liquid crystal monitor and can display various information about consumables. The operation unit 250 is a device configured to receive an operation made by a user. The user can input various instructions to the complex machine 200 by operating the operation unit 250. The communication interface 270 is a wired or wireless network interface for communicating with other apparatuses, and is connected to a network NT.

The scanner unit 280 is configured to optically read a document, which is a reading target, by using a photoelectric conversion element such as a CCD or a CMOS, thereby generating scan data representing a scanned image.

The printing unit 290 is configured to print an image on a sheet being conveyed by a predetermined method while taking out and conveying the sheet in a sheet feeding tray by a conveying mechanism (not shown). In the below, a case where printing is performed by an inkjet method will be described as an example. The printing unit 290 is configured to form an image on the sheet by using ink of the ink cartridge 50 detachably mounted on a cartridge holder 51, according to a print job transmitted from a mobile terminal 300 or a print job generated by itself based on an operation on the operation unit 250. Note that, the entire combination of the ink cartridge 50 mounted on the cartridge holder 51 and the complex machine 200 is an example of the recording apparatus.

Specifically, the printing unit 290 has an inkjet head mounted on a carriage, and printing is performed by the inkjet head ejecting the ink while the carriage moves the inkjet head in a main scanning direction. Note that, specifically, the ink cartridges 50 of respective ink colors of cyan ink, magenta ink, yellow ink and black ink are included. However, for sake of convenience, unless otherwise specified, they are simply referred to as "ink cartridge 50" without distinction.

The mounting detecting sensor 265 is, for example, a connector that conducts with an electrode of the ink cartridge 50 when the ink cartridge 50 is mounted on the cartridge holder 51, for example. The processor 210 can identify whether the ink cartridge 50 is mounted on the cartridge holder 51, based on a detection result of the mounting detecting sensor 265.

The processor 210 is a device configured to perform data processing, and is, for example, a CPU. Note that, the processor 210 is an example of a processor in the main body of the recording apparatus. By executing the print processing program stored in the program storage area 232, the processor 210 is configured to perform various processing shown in FIGS. 4A, 4B, 6, 8A, 8B, 9, 10A, 10B and 11, which will be described later, including data communication to the cartridge 50. The details of the processing contents of the processor 210 will be described later.

The cartridge holder 51 is provided with an opening/closing cover (not shown) that can be opened/closed, and when the ink cartridge 50 is mounted or demounted with respect to the cartridge holder 51, the opening/closing cover is opened, and after the mounting or demounting, the opening/closing cover is closed. The opened state and the closed state of the opening/closing cover are detected by the cover sensor 275 by a known method, and the corresponding detection signals are input to the processor 210.

Note that, the processor 210 may be configured to identify whether the ink cartridge 50 is mounted on the cartridge holder 51, based on the detection result by the cover sensor 275, instead of the mounting detecting sensor 265.

The communication unit 285 is, for example, a terminal or the like, and is electrically connected to the cartridge memory 115 via electrodes 65A to 65C of the ink cartridge 50 mounted on the cartridge holder 51.

<Ink Cartridge>

As shown in FIG. 1B, the ink cartridge 50 includes a cartridge chip 64, which is a so-called IC chip.

<Cartridge Chip>

The cartridge chip 64 is a printed circuit board (PCB), and includes a substrate 63, electrodes 65A to 65C, a cartridge memory 115, and a controller 110. Note that, the cartridge memory 115 is an example of the consumable memory.

<Substrate and Electrodes>

The substrate 63 is a printed wiring board (PWB), and is made of glass epoxy, paper phenol, or the like. The substrate 63 is attached to a surface of the ink cartridge 50.

The electrodes 65A to 65C are formed on the substrate 63. These electrodes 65A to 65C function as an interface for communicating with the communication unit 285 of the complex machine 200.

In a state where the ink cartridge 50 is mounted on the cartridge holder 51, the respective electrodes 65 contact and are electrically connected to respective contact points 142A to 142C of the communication unit 285. Specifically, the electrode 65A contacts and is electrically connected to the contact point 142A, the electrode 65B contacts and is electrically connected to the contact point 142B, and the electrode 65C contacts and is electrically connected to the contact point 142C. Note that, the number of the electrodes 65 is determined according to the number of the contact points 142 of the communication unit 285, and is not limited to three.

<Cartridge Memory>

The cartridge memory 115 has a volatile storage area 120 and a non-volatile storage area 130 that is an EEPROM of a non-volatile semiconductor memory.

The non-volatile storage area 130 has a first storage area 131, a second storage area 132, a third storage area 133, a program storage area 135, and a number-of-initializations count value storage area 136. A variety of programs are stored in the program storage area 135, and the various programs include a program for the ink cartridge 50, including an information processing program relating to execution of the information processing method of the present embodiment based on flowcharts in FIGS. 6, 9 and 11, which will be described later. The first to third storage areas 131 to 133 and the number-of-initializations count value storage area 136 will be described later. Note that, the non-volatile storage area 130 may also be configured by a non-volatile semiconductor memory other than EEPROM, for example, a magnetic resistance memory.

The volatile storage area 120 may also be a volatile semiconductor memory, for example, an SRAM or a DRAM.

Note that, in the volatile storage area 120 or the non-volatile storage area 130, a latch circuit or a magnetic memory may also be adopted instead of the semiconductor memory.

<Controller>

The controller 110 has a writing function to a predetermined address of the cartridge memory 115 when a predetermined signal is detected at the electrode 65A.

In addition, the controller 110 has a function of, when the processor 210 of the complex machine 200 reads out information about the ink cartridge 50 stored in the cartridge memory 115 via the electrode 65B and the contact point 142B, transmitting the information about the ink cartridge 50 from the cartridge memory 115 to the electrode 65B.

The controller 110 is configured by an electronic circuit having the above functions, and is configured to perform various processing shown in FIGS. 4A, 4B, 6, 8A, 8B, 9, 10A, 10B and 11, which will be described later, including data communication to the complex machine 200. The electronic circuit is configured by an electronic component mounted on at least one of a front surface or a back surface of the substrate 63 and a patterned wiring formed on at least one of the front surface or the back surface of the substrate 63. The controller 110 is electrically connected to the electrodes 65A, 65B and 65C and the cartridge memory 115.

Note that, the controller 110 is not limited to the electronic circuit, and may be provided with, for example, a CPU capable of performing calculations, thereby realizing the above functions.

<Information Transmission/Reception Between Complex Machine and Ink Cartridge>

The processor 210 of the complex machine 200 can acquire various information from the cartridge memory 115 of the ink cartridge 50 connected via the communication unit 285 and the electrodes 65A to 65C. Note that, hereinafter, in the present specification, the processing "acquisition" by the processor 210 represents processing of writing information in a non-volatile storage area to a volatile area such as a DRAM, for example. The same applies to the controller 110. Thereby, the processor 210 can identify a type of the ink cartridge 50 mounted on the cartridge holder 51, based on the acquired information. The identification result is associated with a cartridge ID and a model number of the ink cartridge 50 by the processor 210, and is stored at any time in the type information storage area 231A of the consumable-related information storage area 231.

At this time, in the complex machine 200, an ink remaining amount or an ink used amount of the ink cartridge 50 mounted on the cartridge holder 51 is acquired at any time by the processing of the processor 210 by a known method. Then, when the ink remaining amount decreases and reaches a predetermined remaining amount threshold value, or when the ink used amount increases and reaches a predetermined used amount threshold value, it is possible to display on the display unit 240 that the ink cartridge 50 should be replaced. This makes it convenient for the user to replace the ink cartridge 50.

Note that, the ink remaining amount and the ink used amount are collectively referred to as "use amount" as appropriate below, and the information representing the same is referred to as "use amount information". The use amount information acquired as described above can be written to the cartridge memory 115 by processing, which will be described later. In this case, the processor 210 can identify how much the use amount of the ink cartridge 50 is, based on the information acquired via the communication unit 285 while the ink cartridge 50 is mounted on the cartridge holder 51. The identification result, i.e., the use amount information of the ink cartridge 50 is associated with the cartridge ID and the model number by the processor 210, which is then stored at any time in the use amount information storage area 231B of the consumable-related information storage area 231.

Further, when the ink remaining amount or the ink used amount, i.e., the use amount information of the ink cartridge 50 mounted on the cartridge holder 51 is acquired at any time, as described above, the processor 210 stores the history in the use history information storage area 231C, as the use history information.

Features of Embodiment

In the above configuration, the feature of the present embodiment is a processing aspect of the information stored in the cartridge memory 115 when performing reusing of the ink cartridge 50. An outline thereof will be described with reference to FIGS. 2 and 3.

Outline of Method of Comparative Example

Figure 2:
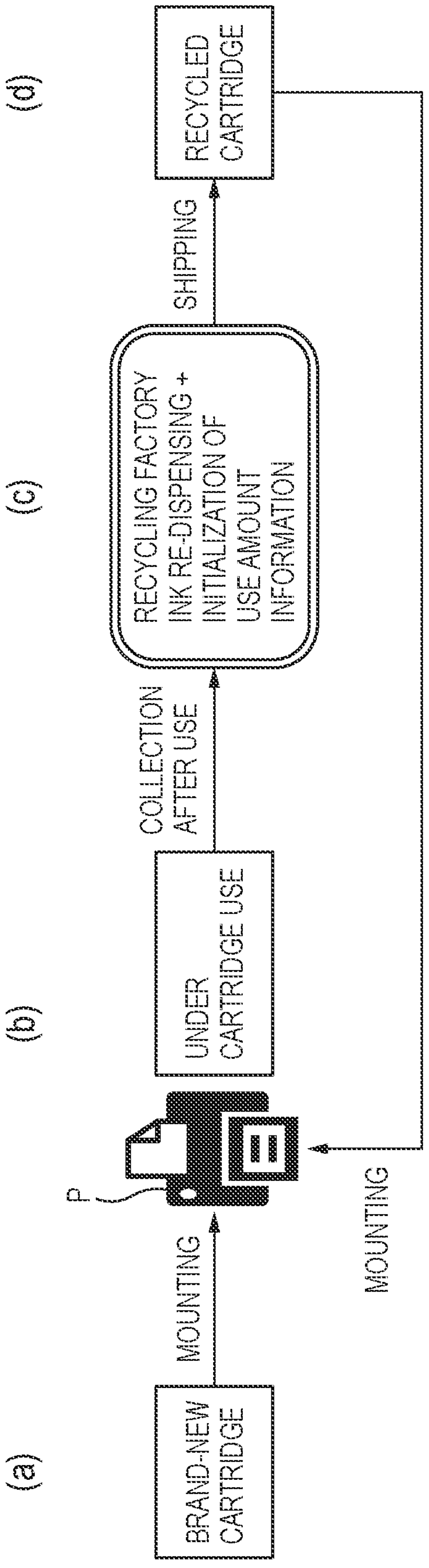
FIG. 2 illustrates a flow of recycling processing and reuse of an ink cartridge in Comparative Example.

That is, as described above, when performing reusing of the ink cartridge 50 once used, the recycling processing is usually performed at a dedicated recycling factory. As shown in FIG. 2 as Comparative Example, when a brand-new ink cartridge 50 ((a) in FIG. 2) is used with being mounted on a printing apparatus P including the complex machine 200 or the like ((b) in FIG. 2) and the ink is empty and used up, the ink cartridge is collected and recovered at the recycling factory. At the recycling factory, the ink is re-dispensed into each ink cartridge 50 ((c) in FIG. 2), and the ink cartridge is shipped again as a recycled product that can be used again by the user ((d) in FIG. 2).

On the other hand, when the use amount information of ink is stored in the cartridge memory 115 as described above, the use amount information stored in the cartridge memory 115 is updated as appropriate as the ink cartridge 50 is used and the remaining amount of ink decreases. As a result, in the ink cartridge 50 after use, the remaining amount represented by the use amount information in the cartridge memory 115 is almost zero. When the ink cartridge 50 collected in this state is subjected to recycling at the recycling factory, the ink cartridge 50 is refilled with ink by the re-dispensing. For this reason, it is necessary to initialize the use amount information at the recycling factory, such as returning the use amount information to the content corresponding to the filled state, i.e., for example, a 100% notation representing a full state (refer to (c) in FIG. 2).

In the specification of the present application, "initialization" means "the initial value of the use amount information is written as an amount of ink that can be used again as a recycled product".

In addition, this initialization is not limited to writing the same value of the use amount information as that at the time of the first factory shipment as described above, and it is sufficient when a value of an amount that can be used again as a recycled product is written. For example, a value corresponding to 50% or more and less than 100% of the value at the time of the factory shipment, which is less than a value of the use amount information at the time of the first factory shipment, may be written as the value at the time of initialization.

Further, the value at the time of initialization does not have to completely match an amount of ink actually filled. For example, the ink cartridge 50 may be filled with ink of an amount exceeding the value at the time of initialization.

However, since an amount of the ink required for re-dispensing may differ depending on a type and a size of the ink cartridge and the required communication specification and the like may differ depending on the specification of the cartridge memory 115, a processing burden at the recycling factory may increase. In particular, in order to widely spread the reuse of consumables, it is necessary for as many waste disposal companies as possible to handle the recycling at the recycling factory. However, depending on the scale, capacity and the like of the disposal companies, there is a risk that the increase in the processing burden will be a hamper.

Outline of Method of Embodiment

Figure 3:
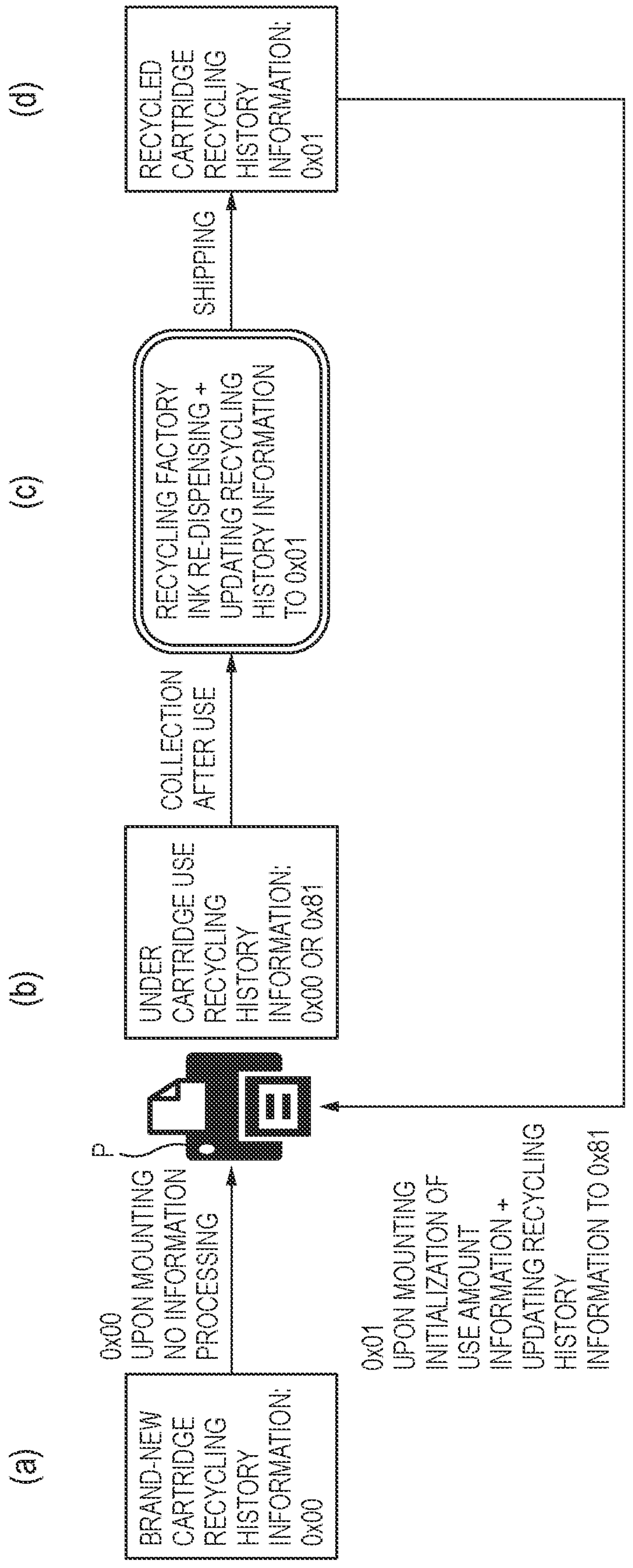
FIG. 3 illustrates a flow of recycling processing and reuse of the ink cartridge in the embodiment of the present disclosure.

In the present embodiment, as shown in FIG. 3, the recycling history information is newly stored in the cartridge memory 115. The recycling history information is information representing whether the ink cartridge 50 has been subjected to the recycling in the past. In the shown example, in the brand-new ink cartridge 50, "0x00" representing "no recycling history" is stored in the cartridge memory 115 ((a) in FIG. 3). In this state, the ink cartridge is mounted on the printing apparatus P and used ((b) in FIG. 3), and is collected at a recycling factory after being used as described above. At the remanufacturing factory, unlike Comparative Example shown in FIG. 2, the ink is re-dispensed, but the processing relating to the use amount information is not performed. Instead, at the recycling factory, the recycling history information is updated from the above-described "0x00" to "0x01" representing "there is a recycling history" that recycling has been performed ((c) in FIG. 3), and is then shipped. ((d) in FIG. 3).

Unlike the initialization of the use amount information described above, since the updating of the recycling history information is not affected by the type and size of the ink cartridge 50, the specification of the cartridge memory 115, and the like, and just changes the information from "no recycling history" to "there is a recycling history", the burden on the recycling factory-side can be small.

In the present embodiment, when the recycled and shipped ink cartridge 50 is mounted on the printing apparatus P, the use amount information is initialized in the printing apparatus P((b) in FIG. 3). At this time, in the printing apparatus P, the use amount information of the ink cartridge 50 is initialized only when the recycling history information is "0x01" of "there is a recycling history" ((d) in FIG. 3→(b) in FIG. 3), and in the case of "0x00" of "no recycling history", the use amount information is not updated ((a) in FIG. 3→(b) in FIG. 3). Thereby, the use amount information is not initialized when the brand-new ink cartridge 50 is mounted, and the use amount information is initialized only when the ink cartridge 50 recycled at the recycling factory is mounted.

As described above, in the present embodiment, the initialization of the use amount information is performed on the printing apparatus P-side, and the recycling factory updates only the recycling history information, so that it is possible to reduce the processing load on the recycling factory-side.

<Processing Flow>

In order to realize the above method, the processing performed by the processor 210 of the complex machine 200 and the controller 110 of the ink cartridge 50 of the present embodiment will be described sequentially with reference to FIGS. 4A, 4B and 6.

<Processing in Complex Machine>

First, the processing performed by the processor 210 of the complex machine 200 will be described with reference to the flowcharts of FIGS. 4A and 4B. Note that, in the following description, the description of each processor is omitted as appropriate, and "in the processor 210 of the complex machine 200", "by the processor 210 of the complex machine 200", and the like may be simply described as "in the complex machine 200", "by the complex machine 200" and the like.

Figure 4A:
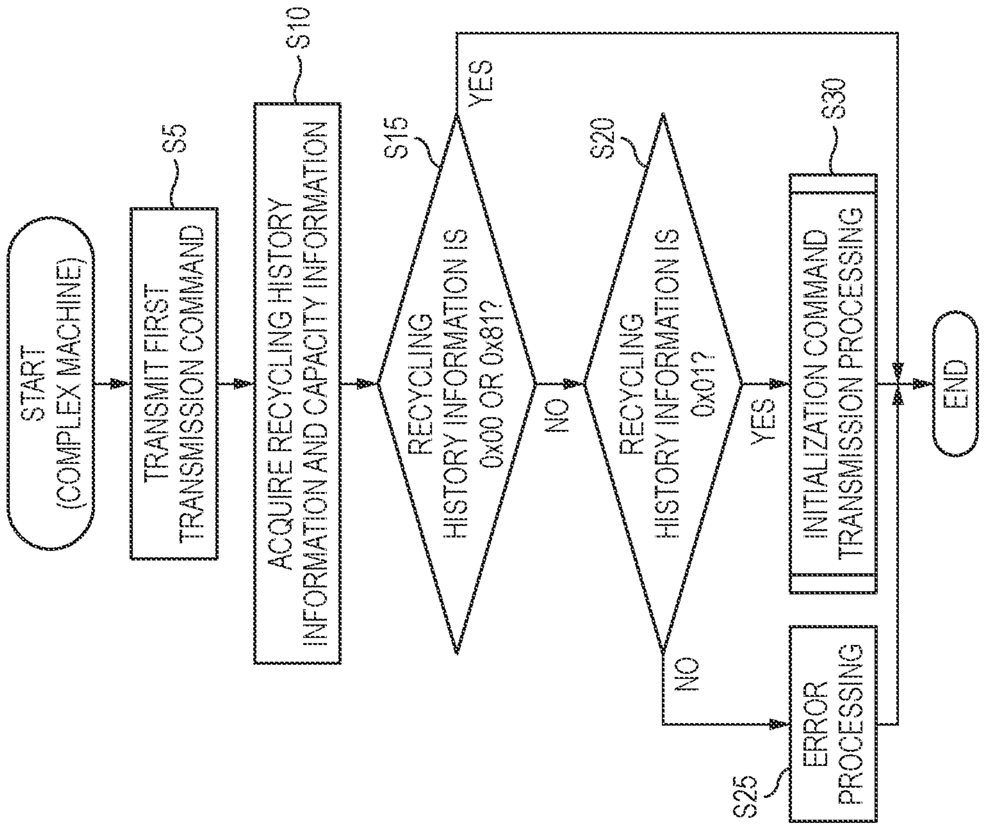
FIG. 4A is a flowchart showing a control procedure performed by a processor of the complex machine.

In FIG. 4A, first, in the processor 210 of the complex machine 200, a first transmission command is transmitted to the ink cartridge 50 (step S5). The first transmission command is a command for instructing the controller 110 to read out and transmit the recycling history information and the capacity information from the first storage area 131 and the third storage area 133 of the cartridge memory 115, respectively. The capacity information is information representing the maximum storage capacity of ink in the corresponding ink cartridge 50. In this example, there are three types of sizes of the ink cartridge 50, and as the capacity information corresponding to each size, three types of "standard", "large capacity", and "extra large capacity" from the small capacity to the large capacity are prepared in advance. Information of any of "standard", "large capacity", and "extra large capacity" is stored in the cartridge memory 115 of the ink cartridge 50.

In step S10, in the processor 210, the recycling history information and the capacity information transmitted from the ink cartridge 50 in response to the first transmission command in step S5 are received and acquired. The processing performed by the processor 210 in steps S5 and S10 is an example of the first acquisition processing.

In step S15, in the processor 210, it is determined whether the recycling history information acquired in step S10 is "0x00" representing "no recycling history" or "0x81" representing "use amount initialization completed" (which will be described later in detail). When the recycling history information is "0x00" or "0x81", it is determined Yes to end the flow. That is, in this case, it is determined in step S15 that the initialization of the use amount information in step S30, which will be described later, is not executed. When the recycling history information is neither "0x00" nor "0x81", No is determined and the processing proceeds to step S20.

In step S20, in the processor 210, it is determined whether the recycling history information acquired in step S10 is "0x01" representing "there is a recycling history". When the recycling history information is not "0x01", No is determined, and after predetermined error processing is performed in step S25, this flow ends. When the recycling history information is "0x01", it is determined Yes to proceed to step S30. That is, in this case, it is determined in step S20 that the initialization of the use amount information in step S30, which will be described later, is executed.

In steps S15 and S20, it is determined whether the initialization of the use amount information of step S30 is executed according to the value of the recycling history information acquired in step S10. Therefore, steps S15 and S20 are examples of the determination step, and the processing performed by the processor 210 in steps S15 and S20 is an example of the determination processing.

In step S30, initialization command transmission processing for instructing the initialization of the use amount information is performed. The detailed contents of step S30 are shown in the flowchart of FIG. 4B.

Figure 4B:
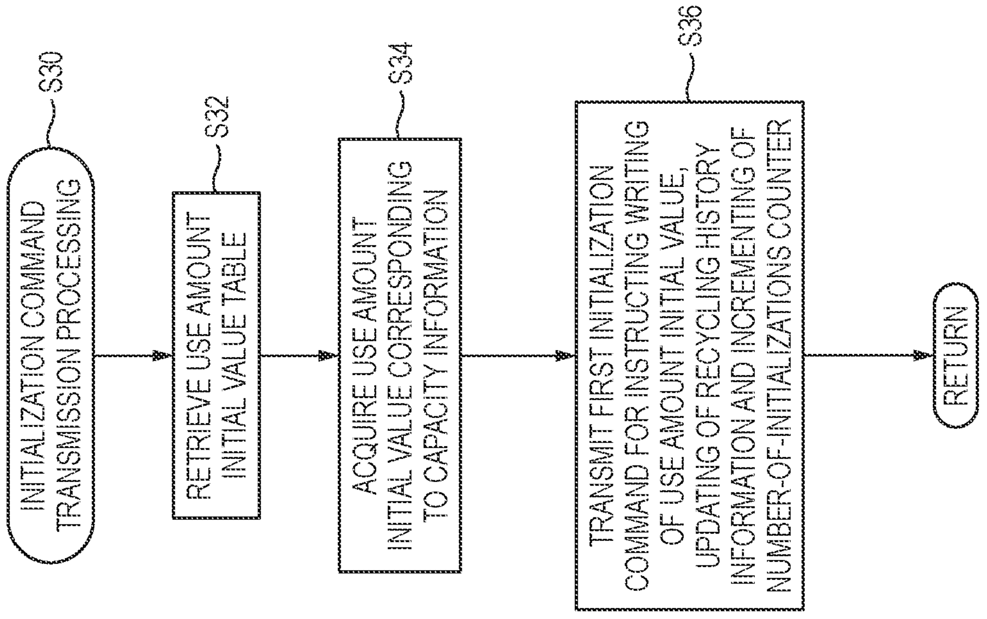
FIG. 4B is a flowchart showing a subroutine in the control procedure shown in FIG. 4A.

In FIG. 4B, first, in step S32, the use amount initial value table stored in the use amount initial value table storage area 233 of the non-volatile storage device 230 is retrieved by using the capacity information acquired in step S10.

FIG. 5 shows an example of the use amount initial value table. As shown, in this table, the use amount initial value to be set when re-dispensing the ink to the ink cartridge 50 is associated with each content of the capacity information of the ink cartridge 50. In this example, the above-described capacity information "standard" is associated with the use amount initial value 15 [ml], the capacity information "large capacity" is associated with the use amount initial value 50 [ml], and the capacity information "extra large capacity" is associated with the use amount initial value 100 [ml].

In the processor 210, the use amount initial value table shown in FIG. 5 is retrieved and the contents thereof are referred to, so that a use amount initial value in the recycling completion state corresponding to the capacity information acquired in step S10 is acquired (step S34). The processing performed by the processor 210 in steps S32 and S34 is an example of the second acquisition processing.

In step S36, in the processor 210, a first initialization command is transmitted to the ink cartridge 50. The first initialization command is a command for instructing the controller 110 to write the use amount initial value acquired in step S34 to the second storage area 132 to initialize the value of the use amount information, to update the recycling history information in the first storage area 131 from "0x01" to "0x81" and to perform an increment of increasing the number of initializations stored in the number-of-initializations count value storage area 136 by 1. Note that, the number of initializations of the count value storage area 136 is set to 0 in the brand-new ink cartridge 50, for example, at the time of manufacturing. The processing performed by the processor 210 in step S36 is an example of the first initialization command transmission processing.

When step S36 is completed, the processing returns to FIG. 4A and the flow of FIG. 4A ends.

<Processing in Ink Cartridge>

Processing performed by the controller 110 of the ink cartridge 50 will be described with reference to FIG. 6. As in the above case, in the following description, "in the controller 110 of the ink cartridge 50", "by the controller 110 of the ink cartridge 50", and the like may be simply described as "in the ink cartridge 50", "by the ink cartridge 50", and the like.

Figure 6:
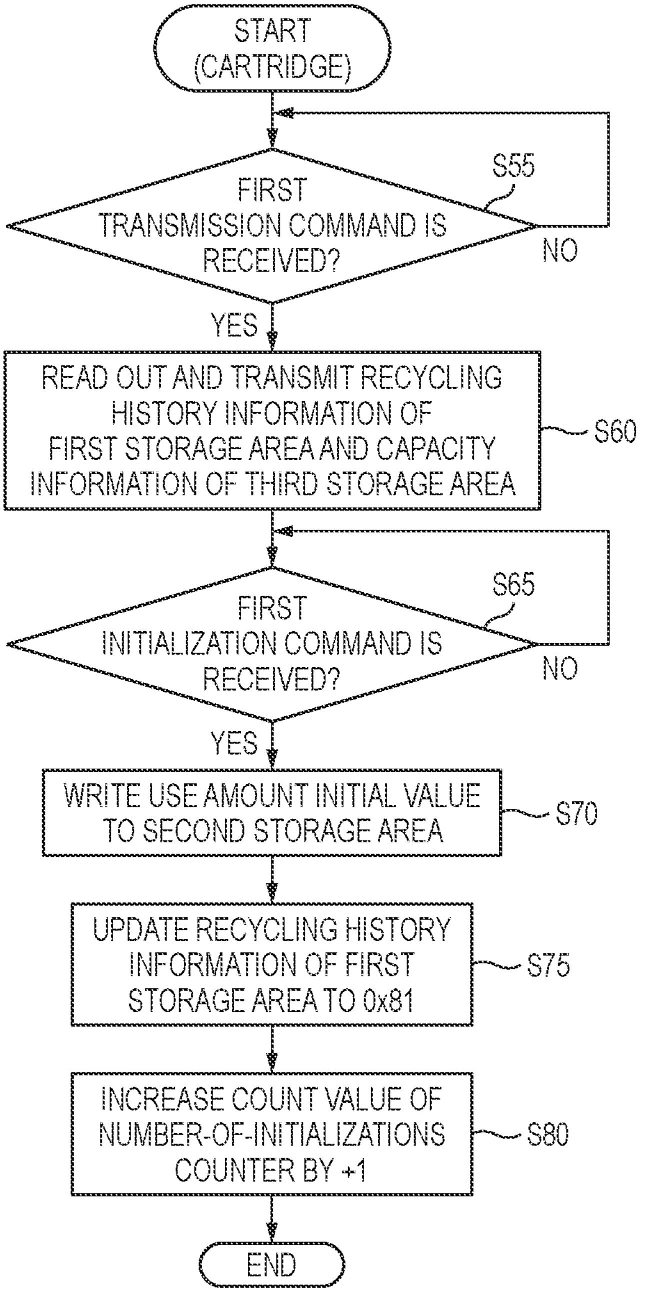
FIG. 6 is a flowchart showing a control procedure performed by a controller of the ink cartridge.

In FIG. 6, first, in the controller 110 of the ink cartridge 50, it is determined whether the first transmission command transmitted from the complex machine 200 in step S5 of FIG. 4A is received. When the first transmission command is received, it is determined Yes to proceed to step S60.

In step S60, by the controller 110, the recycling history information is read out from the first storage area 131 of the cartridge memory 115, the capacity information is read out from the third storage area 133, and these information are transmitted to the complex machine 200.

In step S65, in the controller 110, it is determined whether the first initialization command transmitted from the complex machine 200 in step S36 of FIG. 4B is received. When the first initialization command is received, it is determined Yes to proceed to step S70.

In step S70, by the controller 110, as a part of the writing processing, the use amount initial value received and acquired in step S65 is written to the second storage area 132, whereby the value of the use amount information in the second storage area 132 is initialized.

The processing in which the controller 110 executes step S70 is an example of the use amount information writing processing. In addition, the processing performed by the processor 210 in step S36 of FIG. 4B and the processing performed by the controller 110 in step S70 of FIG. 6 are examples of the initialization processing. Further, step S36 in FIG. 4B and step S70 in FIG. 6 are examples of the initialization step.

In step S75, by the controller 110, the recycling history information in the first storage area 131 is updated to "0x81".

As described above, the recycling history information of the brand-new ink cartridge 50 is "0x00". The recycling history information of the ink cartridge 50 recycled at the recycling factory is "0x01". When the ink cartridge 50 after recycling is mounted on the complex machine 200, the recycling history information is set to "0x81" in step S75.

The end "0" of the recycling history information "0x00" of the brand-new ink cartridge 50 and the end "1" of the recycling history information "0x01" and "0x81" of the ink cartridge 50 after recycling represent whether the ink cartridge is a brand-new product without a recycling history or a recycled product with a recycling history. The ends "0" and "1" are examples of the first information part.

The third "0" of the recycling history information "0x01" of the ink cartridge 50 after recycling at the recycling factory, and the third "8" of the recycling history information [0x81] of the ink cartridge 50 mounted on the complex machine 200 after recycling represent whether there is an initialization history of the use amount information when there is a recycling history. The thirds "0" and "8" are examples of the second information part, the ink cartridge 50 after recycling at the recycling factory is an example of an uninitialized recycled product, and the ink cartridge 50 mounted on the complex machine 200 after recycling and subjected to the initialization of the use amount information in step S75 is an example of the initialized recycled product.

In step S80, by the controller 110, the number-of-initializations count value stored in the number-of-initializations count value storage area 136 is increased only by one.

Thereafter, this flow ends.

Effects of Embodiment

As described above, in the present embodiment, the ink use amount information and the recycling history information of the ink cartridge 50 are stored in the cartridge memory 115. Of the stored contents, the use amount information is processed by the initiative of the complex machine 200-side.

By executing step S5 and S10, the processor 210 of the complex machine 200 communicates with the cartridge memory 115 of the ink cartridge 50 mounted on the complex machine 200 via the communication unit 285, and acquires the recycling history information.

Based on the acquired recycling history information, steps S15 and S20 are executed by the processor 210, and it is determined whether or not to perform the initialization processing of initializing the value of the use amount information stored in the cartridge memory 115. When it is determined to perform the initialization processing, the value of the use amount information of the cartridge memory 115 is initialized in steps S36 and S70.

According to the present embodiment, since the complex machine 200 identifies the recycling history of the ink cartridge 50 and the value of the use amount information is accordingly initialized as appropriate, it is not necessary to perform the initialization of the use amount information at the recycling factory, and it is sufficient to perform the simple processing of just updating the recycling history information. According to the present embodiment, it is possible to reduce the processing load at the recycling factory.

In addition, in the present embodiment, in particular, the content of the recycling history information stored in the cartridge memory 115 of the ink cartridge 50 includes the end "0" or "1", which is the first information part, and the end "0" or "8", which is the second information part.

The first information represents whether the ink cartridge 50 is a recycled product with a recycling history or a brand-new product without a recycling history. The second information represents whether the ink cartridge 50 is an initialized recycled product with an initialization history of the use amount information or an uninitialized recycled product without the initialization history when the ink cartridge 50 is a recycled product.

According to the present embodiment, since the recycling history information includes both the information about the presence/absence of the recycling history and the information about the presence/absence of the initialization of the use amount information accompanying the recycling, it is possible to securely reduce the processing load at the recycling factory, as compared to a case where these information are separately divided.

In addition, in the present embodiment, particularly, when the acquired recycling history information represents that the ink cartridge 50 is an initialized recycled product or that the ink cartridge 50 is a brand-new product, the processor 210 determines not to perform the initialization processing.

When the ink cartridge 50 is a brand-new product, the value of the use amount information has been initialized at the manufacturing factory at the time of manufacturing, so that it is not necessary to re-initialize the use amount information in the complex machine 200 on which the ink cartridge 50 is mounted. When the ink cartridge 50 is an initialized recycled product, the value of the use amount information has been initialized at the recycling factory, so that it is not necessary to re-initialize the use amount information in the complex machine 200 on which the ink cartridge 50 is mounted According to the present embodiment, when the ink cartridge 50 is a brand-new product or an initialized recycled product, it is possible to appropriately handle the ink cartridge without unnecessary processing.

Further, in the present embodiment, in particular, when the acquired recycling history information represents that the ink cartridge 50 is an uninitialized recycled product, the processor 210 determines to perform the initialization processing.

In the present embodiment, when the ink cartridge 50 is an uninitialized recycled product, the use amount information is re-initialized in the complex machine 200, unlike the case where the ink cartridge 50 is a brand-new product or an initialized recycled product.

According to the present embodiment, when the ink cartridge 50 is an uninitialized recycled product, the value of the use amount information is initialized, so that the processing load at the recycling factory can be reduced.

Further, in the present embodiment, in particular, the ink cartridge 50 is provided with the controller 110 configured to control the information reading and writing with respect to the cartridge memory 115, and the updating of the use amount information using the initial value of the use amount information is finally performed by the controller 110 of the ink cartridge 50 (step S36).

In the present embodiment, the initialization command transmission processing is performed by step S36 executed by the processor 210. In the storage device 215, the use amount initial value of each type of the ink cartridge 50 in the recycling completion state is stored. The first initialization command is transmitted to the controller 110 of the cartridge memory 115, so that the initialization processing of initializing the value of the use amount information by writing the use amount initial value acquired from the storage device 215 to the second storage area 132 of the cartridge memory 115 by the controller 110 is performed (step S70).

According to the present embodiment, since the initialization processing of initializing the value of the use amount information is performed using the use amount initial value stored in the storage device 215, the storage capacity of the cartridge memory 115 can be reduced, as compared to a case where the use amount initial value is stored in the cartridge memory 115.

Further, in the present embodiment, in particular, the capacity information of the ink cartridge 50 is stored in the third storage area 133 of the cartridge memory 115. The processor 210 acquires the capacity information transmitted from the controller 110, based on the first transmission command in steps S5 and S10, accesses the storage device 215, based on the capacity information (step S32), and refers to the use amount initial values of the various ink cartridges 50 stored in advance in the storage device 215 to acquire the corresponding use amount initial value in step S34.

According to the present embodiment, it is possible to perform the initialization processing by referring to the use amount initial values of the various ink cartridges 50 stored in the storage device 215 and acquiring and writing an appropriate use amount initial value to the second storage area 132 of the cartridge memory 115. Even when the product lineup or capacity information of the ink cartridge 50 changes, it is sufficient to appropriately correct or update the stored content of the storage device 215 on the complex machine 200-side, so that it is possible to smoothly deal with the change.

Modified Embodiments

Note that, the present disclosure is not limited to the above embodiment, and, for example, modified embodiments such as (1), (2) and (3) below are also included in the technical scope. The modified embodiments will be sequentially described below. The parts equivalent to the above embodiment are denoted with the same reference signs, and the descriptions thereof are appropriately omitted or simplified.

(1) in a Case where the Cartridge Memory Stores the Use Amount Information

Figure 7A:
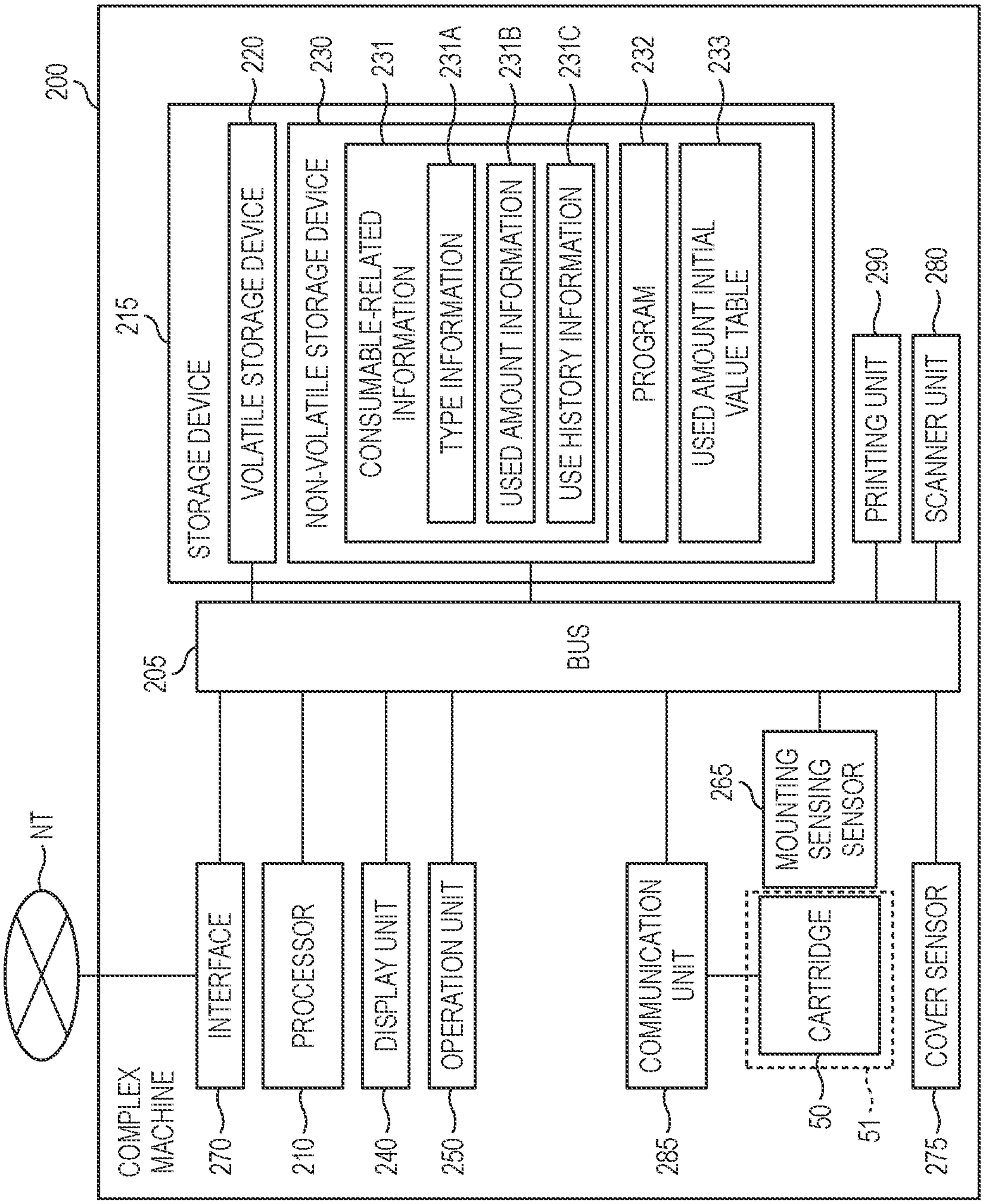
FIG. 7A is a functional block diagram showing an overall schematic configuration of a complex machine according to an embodiment of the present disclosure.
Figure 7B:
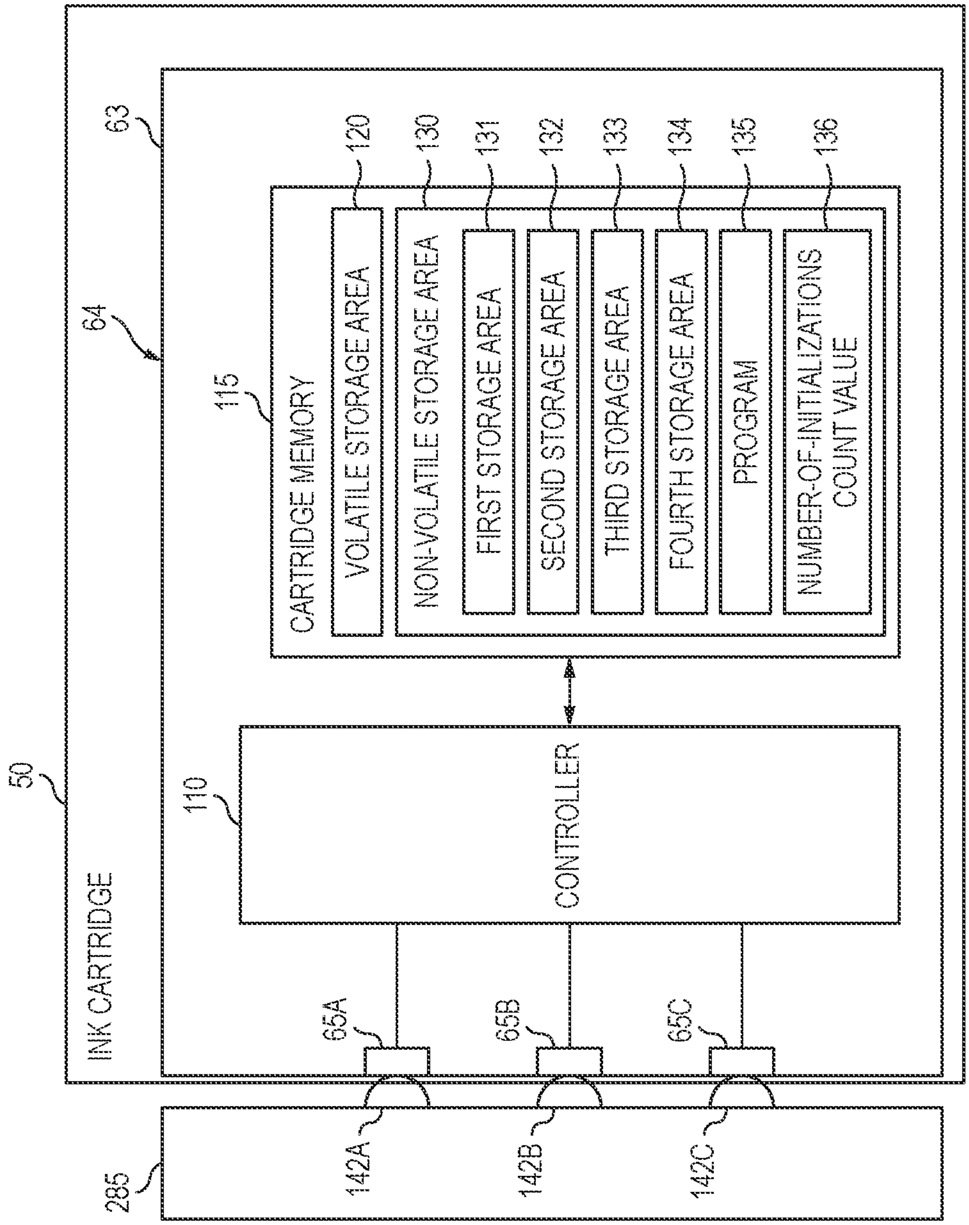
FIG. 7B is a functional block diagram showing a schematic configuration of an ink cartridge in which the use amount information is stored in a cartridge memory.

FIGS. 7A and 7B are functional block diagrams corresponding to FIGS. 1A and 1B of the above embodiment, showing the configurations of the complex machine 200 and the ink cartridge 50 in the present modified embodiment.

The configuration shown in FIG. 7A is the same as that in FIG. 1A. In FIG. 7B, the non-volatile storage area 130 of the ink cartridge 50 is newly provided with a fourth storage area 134. In the present modified embodiment, the use amount initial value to be set at the time of recycling completion of the ink cartridge 50 is stored in advance in the fourth storage area 134. When acquiring the recycling history information from the cartridge 50, the processor 210 of the complex machine 200 also acquires the use amount initial value described above. The processor 210 transmits a second initialization command to the controller 110 of the ink cartridge 50, thereby causing the controller 110 to write the acquired use amount initial value to the second storage area 132.

The processing performed by the processor 210 of the complex machine 200 and the controller 110 of the ink cartridge 50 of the present embodiment so as to implement the above method of the present modified embodiment will be described with reference to FIGS. 4A, 4B and 6.

<Processing in Complex Machine>

First, the processing performed by the processor 210 of the complex machine 200 will be described with reference to a flowchart of FIG. 8A corresponding to FIG. 4A.

Figure 8B:
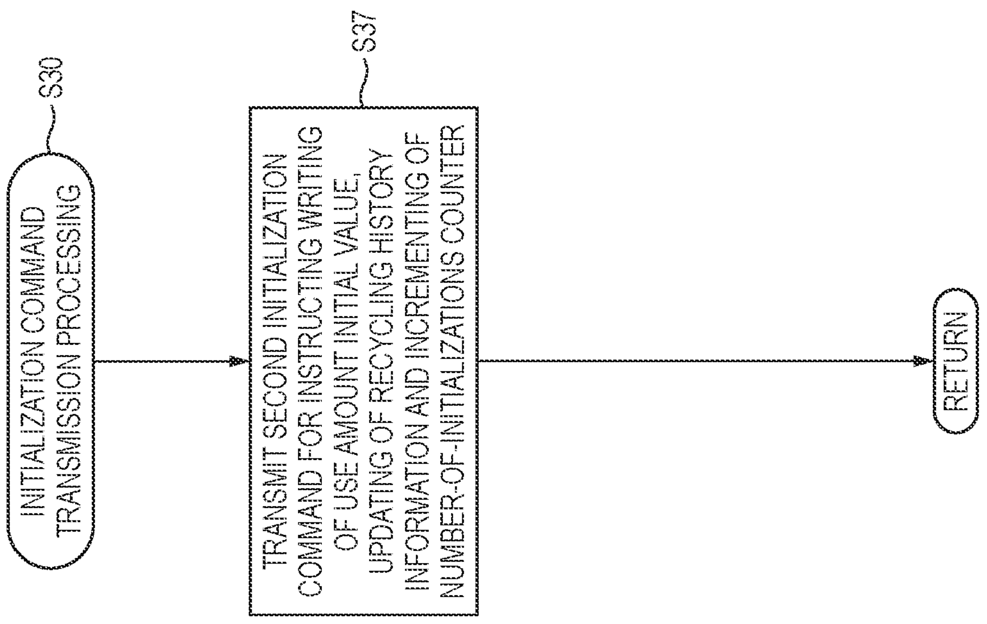
FIG. 8B is a flowchart showing a subroutine in the control procedure shown in FIG. 8A.
Figure 8A:
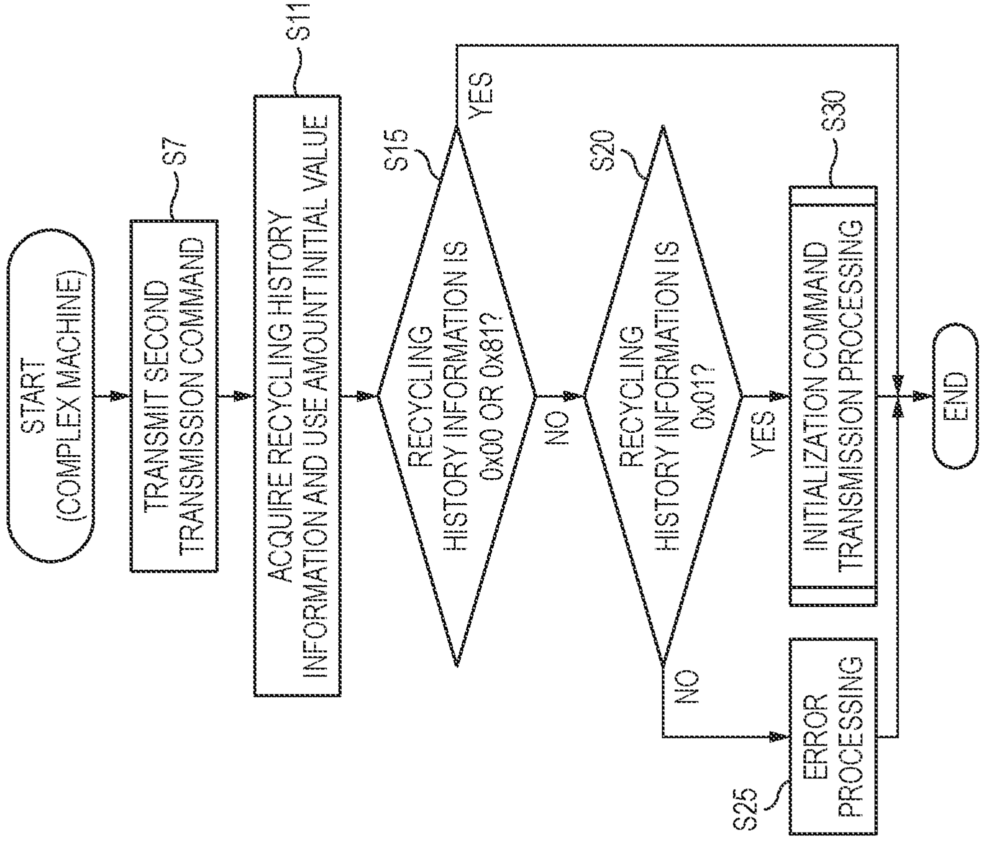
FIG. 8A is a flowchart showing a control procedure performed by a processor of the complex machine.

In FIG. 8A, steps S7 and S11 are newly provided, in place of steps S5 and S10 in FIG. 4A.

First, in step S7, in the processor 210, a second transmission command is transmitted to the ink cartridge 50. The second transmission command is a command for instructing the controller 110 to read out and transmit the recycling history information and the use amount initial value from the first storage area 131 and the fourth storage area 134 of the cartridge memory 115. In the fourth storage area 134, specific numerical information such as 15 [ml], 50 [ml], 100 [ml] and the like is stored in conformity to the size of the ink cartridge 50, the maximum storage capacity of the ink, and the like.

In step S11, in the processor 210, the recycling history information and the use amount initial value transmitted from the ink cartridge 50 in response to the second transmission command in step S7 are received and acquired. The processing performed by the processor 210 in steps S7 and S11 is an example of the first acquisition processing of the present modified embodiment. Thereafter, in steps S15 to S30, the equivalent processing to that of the above embodiment is performed.

The detailed contents of the initialization command transmission processing performed in step S30 in the present modified embodiment are shown in a flow of FIG. 8B corresponding to FIG. 4B.

In FIG. 8B, steps S32 and S34 of FIG. 4B are deleted, and step S37 is newly provided in place of step S36.

In step S37, in the processor 210, a second initialization command is transmitted to the ink cartridge 50. The first initialization command is a command for instructing the controller 110 to write the use amount initial value acquired in step S11 to the second storage area 132 to initialize the value of the use amount information, to update the recycling history information in the first storage area 131 from "0x01" to "0x81" and to perform an increment of increasing the number of initializations stored in the number-of-initializations count value storage area 136 by 2. Step S37 is an example of the initialization step, and the processing performed by the processor 210 in step S37 is an example of the second initialization command transmission processing.

When step S37 is completed, the processing returns to FIG. 8A and the flow of FIG. 8A ends.

<Processing in Ink Cartridge>

The processing performed by the controller 110 of the ink cartridge machine 50 will be described with reference to a flowchart of FIG. 9 corresponding to FIG. 6 in the above embodiment.

Figure 9:
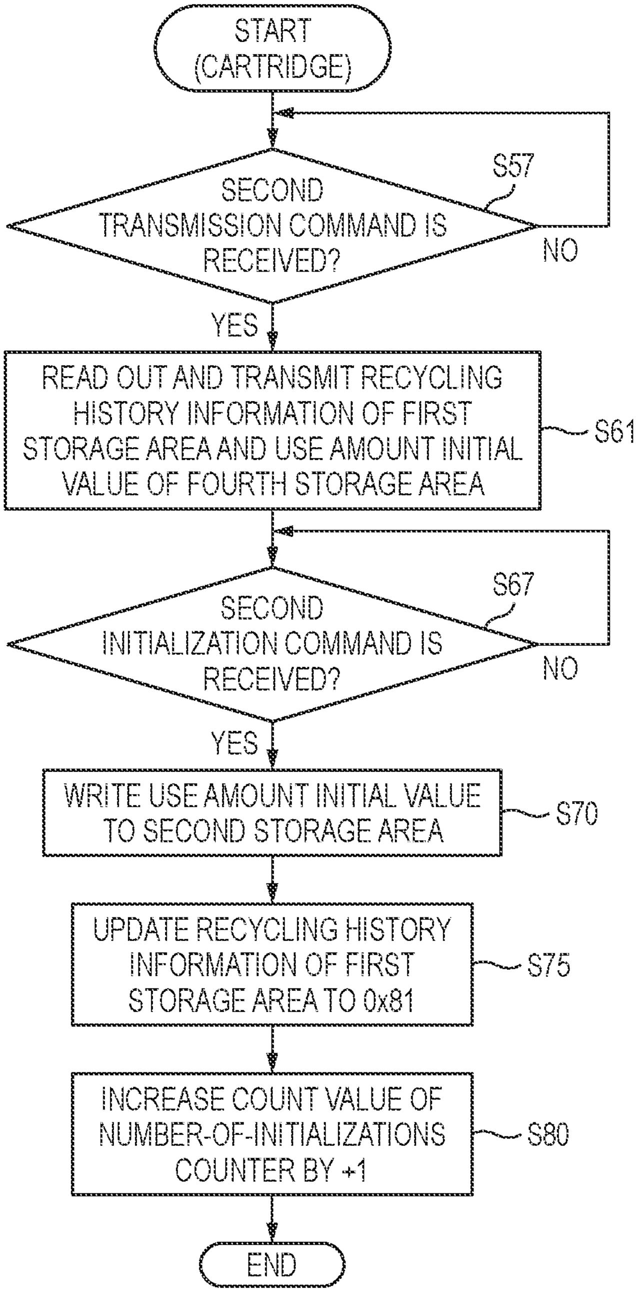
FIG. 9 is a flowchart showing a control procedure performed by the controller of the ink cartridge.

In FIG. 9, steps S57, S61 and S67 are newly provided, in place of steps S55, S60 and S65 in FIG. 6.

First, in step S57, in the controller 110 of the ink cartridge 50, it is determined whether the second transmission command transmitted from the complex machine 200 in step S7 of FIG. 8A is received. When the second transmission command is received, it is determined Yes to proceed to step S61.

In step S61, by the controller 110, the recycling history information is read out from the first storage area 131 of the cartridge memory 115, the use amount initial value is read out from the fourth storage area 134, and these information are transmitted to the complex machine 200.

In step S67, in the controller 110, it is determined whether the second initialization command transmitted from the complex machine 200 in step S37 of FIG. 8B is received. When the second initialization command is received, it is determined Yes to proceed to step S70. In step S70, the similar processing to FIG. 6 is performed, and by the controller 110, the use amount initial value received and acquired in step S67 is written to the second storage area 132, whereby the value of the use amount information in the second storage area 132 is initialized.

In the present modified embodiment, the processing in which the controller 110 executes step S70 is an example of the use amount information writing processing. In addition, in the present modified embodiment, the processing performed by the processor 210 in step S37 of FIG. 8B and the processing performed by the controller 110 in step S70 of FIG. 9 are examples of the initialization processing. Further, step S37 in FIG. 8B and step S70 in FIG. 9 are examples of the initialization step. The processing contents of steps S75 and S80 are similar to those in FIG. 6, and the descriptions thereof are omitted. After step S80, this flow ends.

Effects of Modified Embodiment

In the present modified embodiment, the similar effects to the above embodiment are obtained.

In the present modified embodiment, by executing steps S7 and S11, the processor 210 of the complex machine 200 communicates with the cartridge memory 115 of the ink cartridge 50 mounted on the complex machine 200 via the communication unit 285, and acquires the recycling history information.

Based on the acquired recycling history information, steps S15 and S20 are executed by the processor 210, and it is determined whether or not to execute step S37 of initializing the value of the use amount information stored in the cartridge memory 115. When it is determined to execute step S37 based on the recycling history information, the value of the use amount information of the cartridge memory 115 is initialized by the processor 210 in step S37.

According to the present modified embodiment, as in the above embodiment, it is not necessary to perform the initialization of the use amount information at the recycling factory, and it is sufficient to perform the simple processing of just updating the recycling history information, so that it is possible to reduce the processing load at the recycling factory.

In addition, in the present modified embodiment, the initialization command transmission processing is performed in step S37 executed by the processor 210.

In the fourth storage area 134 of the cartridge memory 115, the use amount initial value of the ink cartridge 50 ina the recycling completion state is stored. The processor 210 transmits the second transmission command to the controller 110 in steps S7 and S11, and acquires the use amount initial value read out and transmitted from the fourth storage area 134 by the controller 110 based on the second transmission command (step S11). In step S37, the second initialization command is transmitted from the processor 210 to the controller 110, so that the initialization processing of initializing the value of the use amount information by writing the acquired use amount initial value to the second storage area 132 of the cartridge memory 115 by the controller 110 is performed (step S70).

According to the present embodiment, since the initialization processing of the value of the use amount information is performed using the use amount initial value stored in advance in the fourth storage area 134 of the cartridge memory 115, the processing on the complex machine 200-side can be simplified.

(2) In a Case of Transmitting a Command to Copy Data from the Complex Machine to the Cartridge <Processing in Complex Machine>

The processing performed by the processor 210 of the complex machine 200 so as to implement the above method of the present modified embodiment will be described with reference to a flowchart of FIG. 10A corresponding to FIG. 8A of the modified embodiment of the above (1).

Figure 10B:
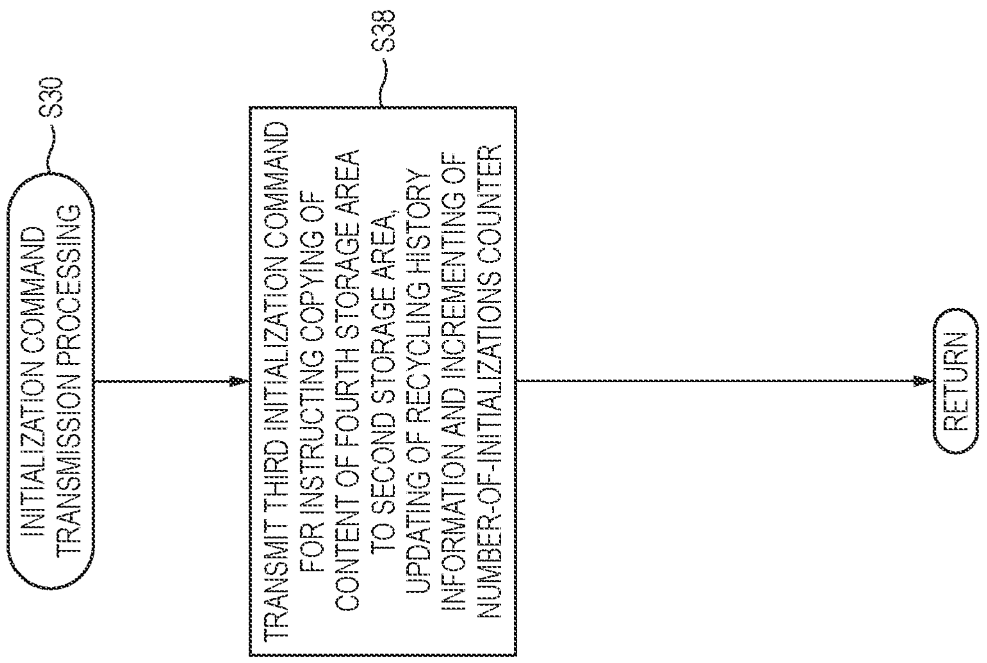
FIG. 10B is a flowchart showing a subroutine in the control procedure shown in FIG. 10A.
Figure 10A:
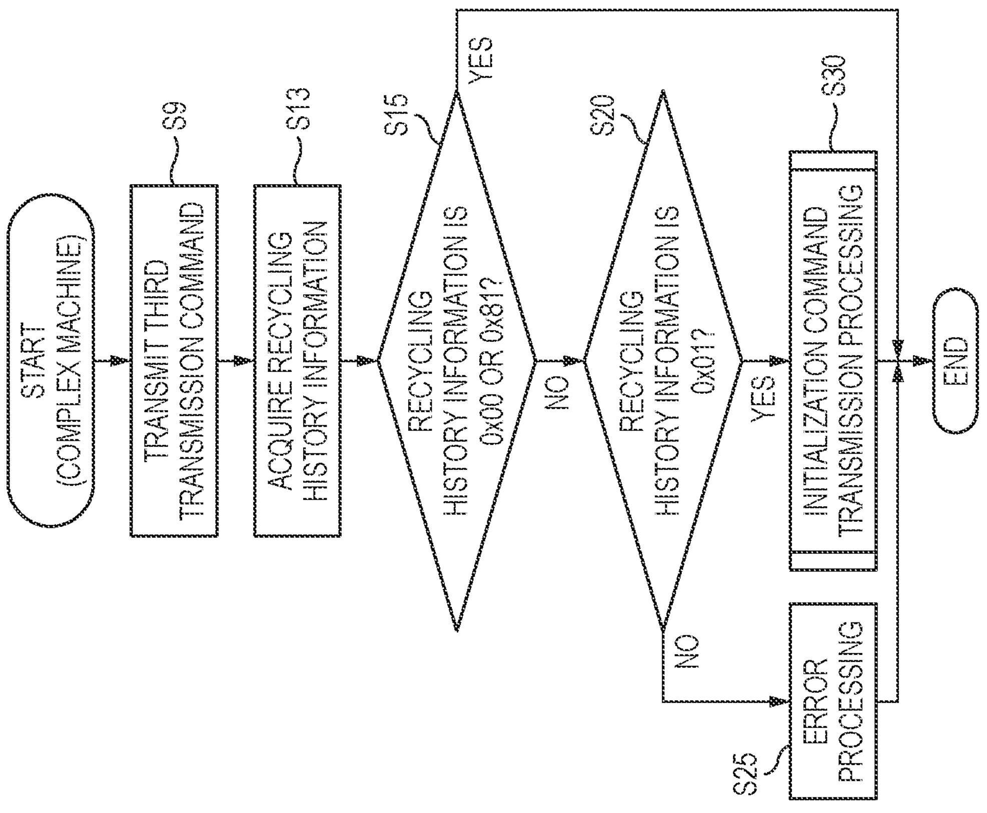
FIG. 10A is a flowchart showing a control procedure performed by the processor of the complex machine in an embodiment of transmitting a command for coping data from the complex machine to an ink cartridge.

In FIG. 10A, steps S9 and S13 are newly provided, in place of steps S7 and S11 in FIG. 8A.

First, in step S9, in the processor 210, a third transmission command is transmitted to the ink cartridge 50. The third transmission command is a command for instructing the controller 110 to read out and transmit the recycling history information from the first storage area 134 of the cartridge memory 115.

In step S13, in the processor 210, the recycling history information transmitted from the ink cartridge 50 in response to the third transmission command in step S9 is received and acquired. The processing performed by the processor 210 in steps S9 and S13 is an example of the first acquisition processing of the present modified embodiment. Thereafter, in steps S15 to S30, the equivalent processing to that of the above embodiment and the modified embodiment of the above (1) is performed.

The detailed contents of the initialization command transmission processing performed in step S30 in the present modified embodiment are shown in a flow of FIG. 10B corresponding to FIG. 8B.

In FIG. 10B, step S38 is newly provided, in place of step S37 in FIG. 8B.

In step S38, in the processor 210, a third initialization command is transmitted to the ink cartridge 50. The third initialization command is a command for instructing the controller 110 to copy the stored content of the fourth storage area 134 to the second storage area 132 to initialize the value of the use amount information, to update the recycling history information in the first storage area 131 from "0x01" to "0x81" and to perform an increment of increasing the number of initializations stored in the number-of-initializations count value storage area 136 by 1. Step S38 is an example of the initialization step, and the processing performed by the processor 210 in step S38 is an example of the third initialization command transmission processing.

When step S38 is completed, the processing returns to FIG. 10A and the flow of FIG. 10A ends.

<Processing in Ink Cartridge>

The processing performed by the controller 110 of the ink cartridge machine 50 will be described with reference to a flowchart of FIG. 11 corresponding to FIG. 9 of the modified embodiment of the above (1).

Figure 11:
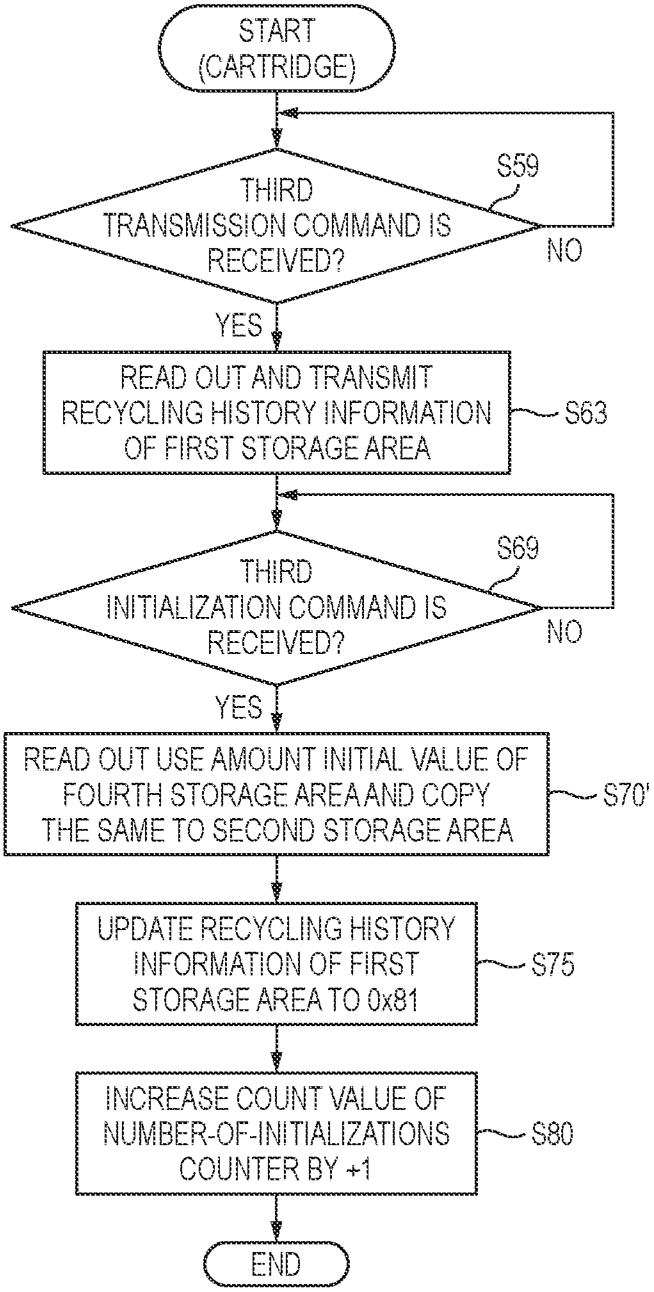
FIG. 11 is a flowchart showing a control procedure performed by the controller of the ink cartridge.

In FIG. 11, steps S59, S63 and S69 are newly provided, in place of steps S57, S61 and S67 in FIG. 9. In addition, instead of step S70 in FIG. 9, step S70' conforming to step S70 is provided.

First, in step S59, in the controller 110 of the ink cartridge 50, it is determined whether the third transmission command transmitted from the complex machine 200 in step S9 of FIG. 10A is received. When the third transmission command is received, it is determined Yes to proceed to step S63.

In step S63, by the controller 110, the recycling history information is read out from the first storage area 131 of the cartridge memory 115 and is transmitted to the complex machine 200.

In step S69, in the controller 110, it is determined whether the third initialization command transmitted from the complex machine 200 in step S38 of FIG. 10B is received. When the third initialization command is received, it is determined Yes to proceed to step S70'.

In step S70', by the controller 110, the use amount initial value stored in the fourth storage area 134 is read out, and as a part of the writing processing, the value is copied to the second storage area 132, so that the value of the use amount information in the second storage area 132 is initialized.

In the present modified embodiment, the processing in which the controller 110 executes step S70' is an example of the use amount information writing processing. In addition, in the present modified embodiment, the processing performed by the processor 210 in step S38 of FIG. 10B and the processing performed by the controller 110 in step S70' of FIG. 11 are examples of the initialization processing. Further, step S38 in FIG. 10B and step S70' in FIG. 11 are examples of the initialization step.

The processing contents of steps S75 and S80 are similar to those in FIGS. 6 and 9, and the descriptions thereof are omitted. After step S80, this flow ends.

Effects of Modified Embodiment

In the present modified embodiment, the similar effects to the above embodiment are obtained.

In the present modified embodiment, by executing steps S9 and S13, the processor 210 of the complex machine 200 communicates with the cartridge memory 115 of the ink cartridge 50 mounted on the complex machine 200 via the communication unit 285, and acquires the recycling history information.

Based on the acquired recycling history information, steps S15 and S20 are executed by the processor 210, and it is determined whether or not to execute step S38 of initializing the value of the use amount information stored in the cartridge memory 115. When it is determined to execute step S38 based on the recycling history information, the value of the use amount information of the cartridge memory 115 is initialized by the processor 210 in step S38.

According to the present modified embodiment, as in the above embodiment, it is not necessary to perform the initialization of the use amount information at the recycling factory, and it is sufficient to perform the simple processing of just updating the recycling history information, so that it is possible to reduce the processing load at the recycling factory.

In addition, in the present modified embodiment, particularly, the processor 210 transmits the third transmission command to the controller 110 of the cartridge memory 115 by steps S9 and S13, thereby acquiring the recycling history information read out and transmitted from the first storage area 131 by the controller 110 based on the third transmission command (step S13). When the recycling history information is acquired, the processor 210 executes step S38 to transmit the third initialization command to the controller 110, so that the initialization processing of initializing the value of the use amount information by reading out the use amount initial value stored in the fourth storage area 134 and copying and writing the same to the second storage area 132 by the controller 110 is performed (step S70').

According to the present embodiment, the value of the use amount information is initialized by simply copying the use amount initial value stored in advance in the cartridge memory 115, so that the processing on the complex machine 200-side can be further simplified.

(3) Others

Note that, in the above embodiment and the respective modified embodiments, the command is transmitted from the processor 210 of the complex machine 200 to the controller 110 of the ink cartridge 50, so that the controller 110 reads out and writes information with respect to the cartridge memory 115. However, the present disclosure is not limited thereto. That is, the processor 210 of the complex machine 200 may be configured to read out and write information with respect to the cartridge memory 115 via the communication unit 285 and the electrodes 65A to 65C without going through the controller 110.

In this case, steps S5, S7 and S9 described above are omitted, and in subsequent steps S10, S11 and S13, each information is directly acquired from the cartridge memory 115 by the processor 210. Further, in steps S36, S37 and S38, the processor 210 directly writes the use amount initial value to the second storage area 132, instead of outputting the first to third initialization commands to the controller 110 and causing the controller 110 to write the use amount initial value to the second storage area 132. The same applies to the updating of the recycling history information and the incrementing of the number-of-initializations count value. That is, in these cases, the initialization processing of initializing the value of the use amount information in the second storage area 132 is performed by the processor 210.

Further, in the above case, the controller 110 may be omitted in the ink cartridge 50, and the processor 210 may directly read out and write information with respect to the cartridge memory 115 via the electrodes 65A to 65C.

Further, in the above, the ink has been taken as an example of the consumable material, and the ink remaining amount or the ink used amount of the ink cartridge 50 has been described as an example of the use amount information. However, the present disclosure is not limited thereto. For example, when a laser type complex machine 200 is used instead of an inkjet type, toner may be used as a consumable material and a remaining amount or use amount of toner in a toner cartridge may be treated as the use amount information, or a drum may be used as a consumable and a remaining life thereof may be treated as the use amount information.

In addition, the flowcharts shown in FIGS. 4A, 4B, 6, 8A, 8B, 9, 10A, 10B and 11 do not limit the present disclosure to the procedures shown in the flowcharts. For example, the procedure may be added or deleted or the sequence may be changed without departing from the gist and technical spirit of the present disclosure.

Further, in addition to the above, the methods by the above embodiment and each of the modified embodiments may be combined for use as appropriate.

In addition, although not specifically exemplified, the present disclosure is put into practice with various changes within a range not departing from the gist of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A recording apparatus comprising:

a main body of the recording apparatus; and a consumable configured to be detachably attached to the main body of the recording apparatus, wherein the consumable has at least a consumable memory having a first storage area and a second storage area, the first storage area that stores recycling history information and the second storage area that stores use amount information of a consumable material included in the consumable; and a controller configured to control reading a writing of information with respect to the consumable memory, wherein the main body of the recording apparatus has a communication unit configured to communicate with the consumable memory via the controller, a main body memory that stores a use amount initial value of each of a plurality of types of the consumables in a recycling completion state and a processor, and wherein the processor is configured to perform:

first acquisition processing of acquiring the recycling history information from the consumable memory of the consumable mounted on the main body of the recording apparatus by communication via the controller and the communication unit;

determination processing of determining whether or not to perform initialization processing of initializing a value of the use amount information stored in the consumable memory, according to the acquired recycling history information via the controller and the communication unit; and first initialization command transmission processing of transmitting, to the controller via the communication unit, a first initialization command for writing the use amount initial value acquired from the main body memory to the second storage area of the consumable memory to initialize the value of the use amount information in a case that it is determined to perform the initialization processing.

2. The recording apparatus according to claim 1, wherein the recycling history information includes:

a first information part representing whether the consumable is a recycled product with a recycling history or a brand-new product without the recycling history; and a second information part representing whether the consumable is an initialized recycled product with an initialization history of the use amount information or an uninitialized recycled product without the initialization history, in a case where the consumable is the recycled product.

3. The recording apparatus according to claim 2, wherein the processor is configured to determine not to perform the initialization processing in the determination processing, in a case where the acquired recycling history information represents that the consumable is the initialized recycled product or that the consumable is the brand-new product.

4. The recording apparatus according to claim 3, wherein the processor is configured to determine to perform the initialization processing in the determination processing, in a case where the acquired recycling history information represents that the consumable is the uninitialized recycled product.

5. The recording apparatus according to claim 1, wherein the consumable memory further has a third storage area in which capacity information of the corresponding consumable is stored, and wherein the processor is further configured to:

transmit, to the controller via the communication unit, a first transmission command for reading out and transmitting the recycling history information and the capacity information from the first storage area and the third storage area of the consumable memory, to acquire the recycling history information and the capacity information transmitted from the controller in response to the first transmission command, in the first acquisition processing;

perform second acquisition processing of acquiring, from the main body memory, the use amount initial value corresponding to the capacity information acquired from the controller of the consumable memory; and transmit, to the controller via the communication unit, the use amount initial value acquired from the main body memory in the second acquisition processing, in the first initialization command transmission processing.

6. A consumable for a recording apparatus, the consumable configured to be detachably attached to a main body of the recording apparatus and comprising a consumable memory configured to communicate with the recording apparatus and a controller configured to control reading and writing of information with respect to the consumable memory, wherein the consumable memory has:

a first storage area in which recycling history information of the consumable is stored, the recycling history information including a first information part representing whether the consumable is a recycled product with a recycling history or a brand-new product without the recycling history, and a second information part representing whether the consumable is an initialized recycled product with an initialization history of use amount information of a consumable material included in the consumable or an uninitialized recycled product without the initialization history, in a case where the consumable is the recycled product;

a second storage area in which the use amount information is stored; and any one storage area of a third storage area in which capacity information of the consumable is stored and a fourth storage area in which a use amount initial value of the consumable in a recycling completion state is stored, and wherein the controller is configured to perform use amount information writing processing of writing a predetermined use amount initial value to the second storage area, in response to receiving a command transmitted from the recording apparatus.

7. The consumable for the recording apparatus according to claim 6, wherein in response to receiving a first transmission command transmitted from the recording apparatus, the controller is configured to read out the recycling history information and the capacity information from the first storage area and the third storage area, to transmit the read recycling history information and the read capacity information to the recording apparatus, and wherein in response to receiving a first initialization command as the command, the controller is configured to write the use amount initial value included in the first initialization command and corresponding to the capacity information to the second storage area, to initialize a value of the use amount information.

8. The consumable for the recording apparatus according to claim 6, wherein in response to receiving a first transmission command transmitted from the recording apparatus, the controller is configured to read out the recycling history information and the use amount initial value from the first storage area and the fourth storage area, to transmit the read recycling history information and the read use amount initial value to the recording apparatus, and wherein in response to receiving a first initialization command as the command, the controller is configured to write the use amount initial value included in the first initialization command to the second storage area, to initialize a value of the use amount information.

9. The consumable for the recording apparatus according to claim 6, wherein in response to receiving a first transmission command transmitted from the recording apparatus, the controller is configured to read out the recycling history information from the first storage area, to transmit the read recycling history information to the recording apparatus, and wherein in response to receiving a first initialization command as the command, the controller is configured to read out the use amount initial value stored in the fourth storage area and write the read use amount initial value to the second storage area, to initialize a value of the use amount information.

10. An information processing method of performing predetermined processing on use amount information of a consumable material included in a consumable and recycling history information of the consumable, the recycling history information being stored in a first storage area a consumable memory of the consumable and the use amount information being stored in a second storage area of the consumable memory where the consumable is configured to be detachably attached to a main body of a recording apparatus, the consumable comprising a controller configured to control reading and writing of information with respect to the consumable memory, and the main body of the recording apparatus has a main body memory that stores a use amount initial value of each of a plurality of types of the consumables in a recycling completion state, the information processing method comprising:

acquiring the recycling history information from the consumable memory by communication via the controller;

determining whether or not to perform initialization processing of initializing a value of the use amount information stored in the consumable memory, according to the acquired recycling history information via the controller; and transmitting, to the controller by communication, a first initialization command for writing the use amount initial value acquired from the main body memory to the second storage area of the consumable memory to initialize the value of the use amount information based on the determining.

11. The information processing method according to claim 10, wherein the recycling history information includes:

a first information part representing whether the consumable is a recycled product with a recycling history or a brand-new product without the recycling history; and a second information part representing whether the consumable is an initialized recycled product with an initialization history of the use amount information or an uninitialized recycled product without the initialization history, in a case where the consumable is the recycled product, and wherein it is determined not to perform the initialization processing, in a case where the acquired recycling history information represents that the consumable is the initialized recycled product or that the consumable is the brand-new product.

12. The information processing method according to claim 11, wherein it is determined to perform the initialization processing, in a case where the acquired recycling history information represents that the consumable is the uninitialized recycled product.

13. The information processing method according to claim 10, wherein the consumable memory further has a third storage area in which capacity information of the corresponding consumable is stored, and wherein the information processing method comprises:

transmitting, to the controller, a first transmission command for reading out and transmitting the recycling history information and the capacity information from the first storage area and the third storage area of the consumable memory, to acquire the recycling history information and the capacity information transmitted from the controller in response to the first transmission command;

acquiring, from the main body memory, the use amount initial value corresponding to the capacity information acquired from the controller of the consumable memory; and transmitting, to the controller by communication, the use amount initial value acquired from the main body memory.

* * * * *